United States Patent Office 2,947,089
Patented Aug. 2, 1960

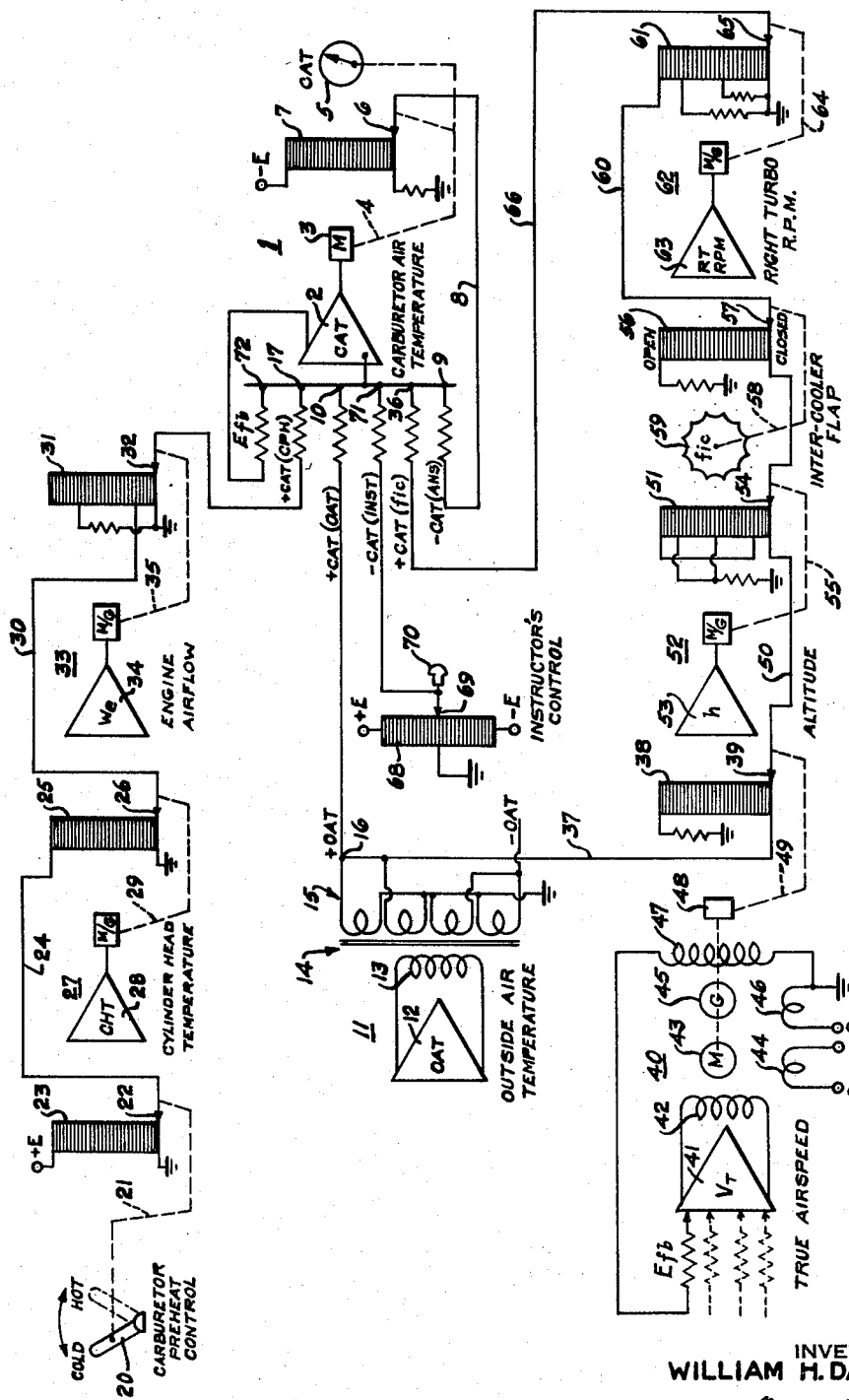

2,947,089

SIMULATED CARBURETOR AIR TEMPERATURE SYSTEM FOR AIRCRAFT TRAINING APPARATUS

William H. Dawson, Jr., Waldwick, N.J., assignor to Curtiss-Wright Corporation, a corporation of Delaware Filed Nov. 24, 1954, Ser. No. 470,917

6 Claims. (Cl. 35—12)

This invention relates to a simulating system for training aircraft personnel in the operation of large multiple-engine aircraft, with particular reference to carburetor air temperature control for engines having a super-charger system for supplying carburetor air.

Simulation of carburetor air temperature is disclosed in a co-pending application of mine and of R. G. Stern, S.N. 436,478, filed June 14, 1954, now Patent No. 2,808,658, granted October 8, 1957. The system shown therein comprises an electrical system for computing carburetor air temperature in accordance with outside air temperature as computed by another electrical computing system and in accordance with the position of a student operated heating control. The present invention is directed to certain improvements in the computation to provide more realistic simulation.

The operation of large aircraft of the multiple-engine, high altitude type such as the U.S. Air Force B–36 type aircraft, involves super-chargers or turbo compressors driven by the engine exhaust gases for supplying air under pressure to the carburetor of each engine. In the B–36 type aircraft for example, there are two turbo compressors for each engine selectively controlled so that carburetor air can be supplied either by one turbo compressor working alone (single-turbo operation) or both compressors working together (dual-turbo operation). The work done on the air by a compressor in raising the air pressure generates heat so that the resulting carburetor air temperature (CAT) due to compressor action is higher than the outside air temperature (OAT). This factor may be of great importance during severe icing conditions where the conventional carburetor pre-heat control needs to be supplemented by additional heat.

In practice, single-turbo operation is used for cruising and normal flying, and dual-turbo operation is used for all ground operations, take-off, etc. and for high-power, high speed cruising. In dual-turbo operation, the turbines run at a lower r.p.m. so that the weight of air handled is less for each turbo for a given carburetor inlet air pressure. Consequently, the turbo heating effect on CAT is less. For supply the same carburetor inlet air pressure by single-turbo operation, the weight of air pumped by the turbo must be increased materially, thereby generating more heat and increasing CAT. Single-turbo operation, where dual-turbo is indicated, is therefore undesirable as it might cause CAT to rise to a point where the inter-cooler is ineffective and detonation results.

In addition to the effect of compressor heat, CAT is influenced by the conventional carburetor pre-heat control that directs air across hot engine surfaces to the compressor inlet and hence to the carburetor. Accordingly, the carburetor pre-heat control factor is dependent upon cylinder head temperature (CHT) and the weight of pre-heated engine air supply ($W_e$).

A principal object of this invention therefore, is to provide an improved, comparatively simple and realistically accurate CAT simulating system for training aircraft personnel, such as the flight engineers, in the CAT control of large multiple-engine aircraft having engine super-chargers.

In accordance with the present invention, the combined effects of super-charger operation, carburetor pre-heat control and other flight and engine factors on the carburetor air temperature of large super-charged aircraft engines is efficiently and accurately simulated by means of a novel arrangement of electronic computing means and servo systems comprising an analog computer.

The invention will be more fully set forth in the following description referring to the accompanying drawing, and the features of novelty will be pointed out with particularity in the claims annexed to and forming a part of this specification.

Referring to the drawing, the single figure thereof represents schematically and diagrammatically a CAT control simulating system of the character above referred to.

The CAT computer is represented basically by an electric servo system of the well-known automatic balancing type designated generally at 1. The servo system comprises an alternating current summing amplifier 2 of conventional design, the input network of which is fed by a plurality of A.C. voltages variable in magnitude and sense, and the resultant output is fed to a servo motor 3 and its associated apparatus that will presently be described in more detail. The CAT servo motor drives through a mechanical connection indicated at 4, the CAT indicator 5 and also the slider contact 6 of the servo "answer" potentiometer 7 that in turn derives a negative servo answer voltage. This voltage is fed by conductor 8 to the input network terminal 9 of the CAT amplifier. Operation of the CAT servo in accordance with the magnitude and sense of the resultant of the various amplifier input voltages so positions the CAT indicator 5 as to represent the carburetor air temperature of the engine that is simulated.

Carburetor air temperature is based primarily on outside air temperature (OAT). Other factors as above indicated are carburetor pre-heat control and compressor heat as modified by certain flight factors and the position of the inter-cooler flap. Another factor in the simulating system is the instructor's control for enabling the instructor either to increase or decrease CAT by applying a signal voltage of corresponding sense to the amplifier input network. Although it is unusual for CAT ever to fall below OAT, the instructor in charge of training may wish to decrease CAT to represent icy conditions or a faulty gauge.

The primary OAT signal is applied to the CAT amplifier input network at terminal 10 and is derived from an OAT computer designated generally at 11 comprising an amplifier 12, the output of which energizes the primary winding 13 of a transformer 14. The transformer has a secondary winding arrangement 15 for producing at opposite terminals OAT signal voltages dephased by 180°. The voltage +OAT at terminal 16 represents an instantaneous phase value with respect to an A.C. reference voltage for the system, and this voltage is applied to the CAT amplifier input terminal 10. A system for computing OAT is specifically disclosed in a copending application S.N. 291,254, filed June 2, 1952, by Stern et al., now Patent No. 2,798,308, granted on July 26, 1957.

In the airplane itself, carburetor pre-heat is obtained by changing from normal ram air in-take of the turbo to engine cooling air supplied by the cooling fan. This air has passed over the hot engine cylinders and hence its temperature is increased. The amount of pre-heat, therefore, depends on the temperatures of the cylinders at the time the air passes over them and also the amount of air being used by the engine. Therefore, carburetor pre-heat control which is subject to control by the flight engineer, depends primarily on the cylinder head temperature (CHT) and the engine air flow ($W_e$). The A.C. signal representing carburetor pre-heat is applied to the terminal 17 of the CAT amplifier input network and is derived as follows: the flight engineer's carburetor pre-heat control lever 20 is suitably connected as indicated at 21 to the slider 22 of the pre-heat control potentiometer 23. This potentiometer is energized at its upper terminal by an A.C. voltage having a reference polarity $+E$, and is grounded at its lower terminal so that in the "cold" position of the pre-heat control, zero voltage is derived at slider 22, and in the "hot" position the maximum voltage $+E$ is derived at the slider contact. This voltage is modified according to CHT and $W_e$ so as to represent the resultant effect of carburetor pre-heat. To this end, the voltage at slider 22 is connected by conductor 24 to the upper terminal of CHT potentiometer 25. The lower terminal of this potentiometer is grounded so that the voltage derived at slider 26 is a function of CHT and the amount of desired pre-heat control. The slider 26 is positioned by the CHT servo, generally indicated at 27, and comprising a servo amplifier 28 and servo motor, etc. mechanically connected as indicated at 29 to the slider 26. The CHT computing system is specifically disclosed in a copending application S.N. 436,328 filed June 14, 1954 by R. G. Stern et al., now Patent No. 2,824,388, granted on February 25, 1958.

The CHT derived voltage at slider 26 is in turn fed by conductor 30 to a $W_e$ potentiometer card 31 as indicated. Slider 32 of this card is positioned by the $W_e$ servo generally indicated at 33 and comprising a servo amplifier 34, servo motor, etc. operatively connected as indicated at 35 to the slider 32. Accordingly the derived voltage at slider 32, which is fed to the input network terminal 17 of the CAT amplifier, represents combined functions of pre-heat control, CHT and $W_e$. The $W_e$ card 31 is designed according to the engine air flow for the engine in question. A $W_e$ computing system is specifically disclosed in the aforesaid Patent No. 2,824,388.

The heating factor due to the engine super-charger or turbo compressor is a function of a number of factors including OAT, true airspeed ($V_T$), altitude ($h$) turbo r.p.m. and the inter-cooler flap position ($f_{ic}$). Essentially, this represents the heat of compression (from the turbo compressor) added to the air which is directed through the inter-cooler flaps where it is brought to a normal operating temperature before entering the carburetor. The temperature of this air before entering the compressor is also modified by flight factors including $V_T$, H and OAT.

For simulating purposes, the inter-cooler air signal is applied to the terminal 36 of the input network of the CAT amplifier and is obtained in the following manner: An A.C. signal representing $+OAT$ is fed from output terminal 16 of the OAT transformer by conductor 37 to the lower terminal of the $V_T$ card 38. It is to be noted that the $+OAT$ signal derived from the terminal 16 is the origin of the signal $+CAT$ (OAT) as previously described, and is also as will be seen hereinafter, the origin of the input signal $+CAT$ ($f_{ic}$) applied to the terminal 36 of the CAT amplifier 2. The slider 39 of this card is positioned by the $V_T$ servo generally indicated at 40, the circuitry of which is illustrated in more detail. As the other servo systems herein indicated are essentially the same insofar as the amplifier and motor-generator operation are concerned, a single illustration of a typical servo system will suffice. The $V_T$ servo amplifier 41 is connected, as in the case of the CAT amplifier, to an input network for applying various component A.C. signal voltages (representing airspeed factors) to the amplifier. A $V_T$ computing system is specifically disclosed by way of example in a copending application S. N. 291,253, filed June 2, 1952, by Stern et al., now Patent No. 2,784,501, granted on March 12, 1957.

The output of the $V_T$ amplifier energizes a control winding 42 of a two-phase A.C. motor 43, the other phase winding 44 being energized by the A.C. reference voltage $e_1$. The operation of this type of motor is well-known, the motor speed and direction being according to the magnitude and phase relation respectively of the current in the control winding 42. A conventional feedback two-phase generator 45 is connected to the motor and comprises a reference winding 46 energized by the A.C. reference voltage $e_2$ and a generating winding 47 in which a feedback voltage $E_{fb}$ is generated, the phase relation and magnitude of this voltage depending respectively on the direction and speed of rotation of the generator. The $V_T$ motor generator (M—G) is suitably connected through a gear reducer 48 and mechanical connection 49 to the potentiometer slider 39. The $V_T$ potentiometer card 38, as in the case of the other potentiometers indicated in the drawing is actually of the circular wound-card type but is shown in a plane development for simplifying the disclosure. In practice, the slider 39 is operated by a shaft disposed centrally of the circular card so as to make continuous contact therewith throughout the range of the servo motor. The A.C. signal voltage derived at the $V_T$ slider 39, representing functions of OAT and $V_T$, is now fed by conductor 50 to the lower terminal of the altitude card 51, the slider of which is positioned by the altitude servo generally indicated at 52. This servo also comprises a servo amplifier 53, servo motor, etc., and positions the slider 54 of the $h$ card by a mechanical connection indicated at 55. The $h$ card 51 is designed according to altitude for air density effect. An altitude computing circuit is specifically illustrated by way of example in the aforesaid Patent No. 2,784,501. The derived voltage at $h$ slider 54, which can be considered as representing weight of the air (volume times density), is in turn fed to the lower terminal of the inter-cooler flap card 56, the slider 57 of which is positioned as indicated at 58 by the flight engineer's inter-cooler flap control 59. The position of this control represents the inter-cooling effect for reducing the heat of compression of the super-charger and in the "closed" position shown represents "no cooling." The inter-cooler signal voltage derived at slider 57 is fed by conductor 60 to the upper terminal of a card 61 of the right turbo r.p.m. (RT—r.p.m.) servo system generally indicated at 62. This system comprises a servo amplifier 63, servo motor, etc., for operating by means of a mechanical connection 64, the slider 65 of the card 61. The card 61 is designed according to the compressor characteristics so that the resultant signal voltage derived at slider 65 represents the compressor heat modified as previously indicated. This A.C. signal is fed by conductor 66 to the terminal 36 of the CAT input network.

At this point is should be noted that a single-turbo system 62 representing the right turbo r.p.m. is disclosed for introducing the compressor heat factor. Although there are two turbos for each engine in the actual airplane and although the complete simulating apparatus for this airplane utilizes two corresponding turbo servos, I have found that the right turbo r.p.m. servo alone can be accurately used as a function servo for controlling CAT according to turbo r.p.m. In other words, both single-turbo and dual-turbo r.p.m. are simulated on the one function servo. This is possible because in practice the right turbo is operating whether the flight crew have the selector switch on single or dual turbo. However, upon shifting from single-turbo to dual-turbo, the right turbo r.p.m. will change speed in the direction of decreased r.p.m. and I have found that this gives for simulating purposes the correct CAT for dual operation. In shifting from dual-turbo to single-turbo, the right turbo (which always operates on single-turbo operation) runs at a higher r.p.m., thereby increasing weight of air flow through the turbo and generating more heat for that turbo. I have found that the increase in single-turbo r.p.m. is proportionate to the resulting increase in CAT so that the right turbo servo can function for both single-turbo and dual-turbo operation; in this respect, reference is made to a copending application Serial No. 470,915, now Patent No. 2,909,853, filed concurrently herewith by Julius Port for "Simulated Super-charger Control for Aircraft Engines," and assigned to the same assignee as the present invention for specifically disclosing control circuitry for the right turbo (RT) electric servo system (reference numeral 23 in the copending application and reference numeral 62 in the present case) which is solely used in the present invention to simulate both single-turbo and dual-turbo supercharger r.p.m. Duplication of this circuitry is not believed necessary for a complete understanding of the present invention.

The above system will also give approximately the correct CAT indication for turbo failure conditions. If for example, the right turbo (RT) fails while operating on single-turbo, the pressure increase is zero, and since the turbo slider 65 is now grounded there will be no signal at the CAT input terminal 36. Therefore the carburetor entrance pressure (CEP) will be equal to the outside air pressure (OAP). Accordingly, no CAT rise is indicated in the simulating apparatus due to the compression factor. In practice, when the engine is operating on dual-turbo and the left turbo fails, all the engine exhaust gases will pass through the left turbo outlet because the resistance to flow is so much less than the resistance presented by the active right turbo. As a result, the right turbo now has also effectively "failed" although mechanically sound. Hence the right turbo r.p.m. will drop to zero and CAT will correctly reflect no CAT rise due to compression. However, should the flight crew turn the turbo control switch to single-turbo control thereby closing a valve isolating the failed left turbo, normal single-turbo operation would be resumed. This would produce corresponding increase in CAT as the right turbo r.p.m. increases. In the simulating apparatus, the control of the RT servo as specifically disclosed in the aforesaid Port application causes an increase in CAT as the derived r.p.m. voltage increases.

The input signals for the CAT system are in general represented as of positive phase relation for additive effect with respect to the main +OAT signal. That is, generally speaking, all other factors tend to increase CAT above OAT. The one exception to this is the instructor's control represented by the potentiometer 68, the opposite terminals of which are energized by oppositely phased voltages and the card being grounded at a center tap. The slider 69 is adjustable by means of the instructor's control knob 70 so as to introduce at will voltages of opposite sense to the CAT system at input terminal 71 for increasing or decreasing CAT, for example, icy conditions or a faulty CAT gauge. Other CAT inputs include a conventional stabilizing feedback signal $E_{fb}$ at terminal 72, in addition to the negative "answer" voltage previously referred to at input terminal 9.

The operation of the simulating system is believed to be apparent from the above description. In the aircraft itself, CAT ordinarily is equal to OAT when the engine is off. This is also true in the simulating apparatus because the only input to the CAT servo under this condition is the OAT signal applied at input terminal 10 of the CAT network. The signal voltage at input terminal 36 from the inter-cooler and compressor system is zero because the right turbo r.p.m. is zero, thereby positioning the slider 65 at ground potential. The carburetor pre-heat signal voltage at terminal 17 is also zero because the CHT servo indicates low temperature so as to ground the CHT slider 26; also engine air flow is at zero causing the $W_e$ slider 32 to be grounded. The exception to this would be "wind milling" before the cylinder heads have cooled to outside air temperature after the engine has been shut down. However, the simulating apparatus would correctly indicate CAT in this case if the carburetor preheat control were turned on. That is, CAT would indicate a value somewhat above OAT, depending on the wind milling speed (airflow) and CHT at that time.

In normal operation, the pre-heat control system and the inter-cooler and compressor system combine to maintain CAT sufficiently above OAT so that, in the simulating apparatus as in actual flying, CAT is prevented from dropping to a point, for example, where there is danger of carburetor icing. This condition is, of course, possible where no compressor heat is available and where CHT has been allowed to drop below a safe value.

It should be understood that this invention is not limited to specific details of construction and arrangement thereof herein illustrated, and that changes and modifications may occur to one skilled in the art without departing from the spirit of the invention.

What is claimed is:

1. In an aircraft trainer having flight aerodynamic condition and engine dynamic condition computers, the latter being responsive to a plurality of simulated manual controls including two manual controls for varying simulated carburetor air temperature, function generating means responsive to each of said controls for deriving an electrical signal in accordance with the position of that control, said computers including a plurality of electrical servo and summing systems some of which produce output signals representing ambient and dynamic flight factors respectively determinative of the simulated flight, one of said systems being a computer of simulated outside air temperature, a second of said systems being adapted to compute and indicate simulated carburetor air temperature in response to an input signal supplied thereto by said outside air temperature computer and additional input signals derived from function generators responsive to said two manual controls, at least two further systems adapted to compute dynamic factors representing engine supercharger r.p.m. and engine air flow respectively, means for modifying the function generator signals in accordance with the operation of said engine factor computing systems, respectively and means to apply said modified signals as said additional input signals to the carburetor air temperature computing system for operating an indicating instrument representing carburetor air temperature.

2. Apparatus as specified in claim 1 wherein one manual control is a simulated carburetor preheat control and wherein the preheat control signal is modified by the engine air flow computer and a cylinder head temperature computer.

3. Apparatus as specified in claim 2 wherein the electrical system representing engine air flow also modifies the preheat control signal.

4. Apparatus as specified in claim 1 wherein the other manual control is a simulated inter-cooler flap control and wherein the supercharger r.p.m. system for modifying the flap control signal is a computer of turbo supercharger r.p.m. including a servo-motor system operable in two ranges of speed representing single turbo and dual-turbo r.p.m. respectively.

5. Apparatus as specified in claim 1 wherein an input signal to the carburetor air temperature system constitutes a modified outside air temperature signal, and said supercharger r.p.m. computing system for modifying the corresponding manual control signal is an electric servo-motor system operable in two speed ranges to represent single-turbo and dual-turbo supercharger r.p.m. respectively.

6. In an aircraft trainer having flight aerodynamic condition and engine dynamic condition computers, the latter being responsive to a plurality of simulated manual controls, function generating means responsive to at least two of said manual controls for deriving electrical signals in accordance with the positions respectively of said controls, said computers including a plurality of electrical servo and summing systems some of which produce output signals representing ambient and dynamic flight factors respectively determinative of the simulated flight, said systems including outside air temperature, true airspeed, altitude, turbo supercharger r.p.m., and carburetor air temperature computing systems, means to apply an input signal to said carburetor air temperature computer in accordance with computed outside air temperature, one manual control being a simulated inter-cooler flap control, means to modify an output signal representing outside air temperature in accordance with computed true airspeed, altitude, turbo supercharger r.p.m., and further in accordance with the position of said inter-cooler flap control, means to apply said modified outside air temperature signal as a second input signal to said carburetor air temperature computer in addition to the aforesaid outside air temperature input signal to represent effect of supercharger operation on carburetor air temperature, and an indicating instrument responsive to the aforesaid computer for representing simulated carburetor air temperature.

References Cited in the file of this patent

UNITED STATES PATENTS

| | | |
|---|---|---|
| 2,638,783 | Rittner et al. | May 19, 1953 |
| 2,656,977 | Cummings | Oct. 27, 1953 |
| 2,687,580 | Dehmel | Aug. 31, 1954 |
| 2,784,501 | Stern et al. | Mar. 12, 1957 |
| 2,808,658 | Stern et al. | Oct. 8, 1957 |
| 2,842,867 | Dehmel | July 15, 1958 |